Figure 1:
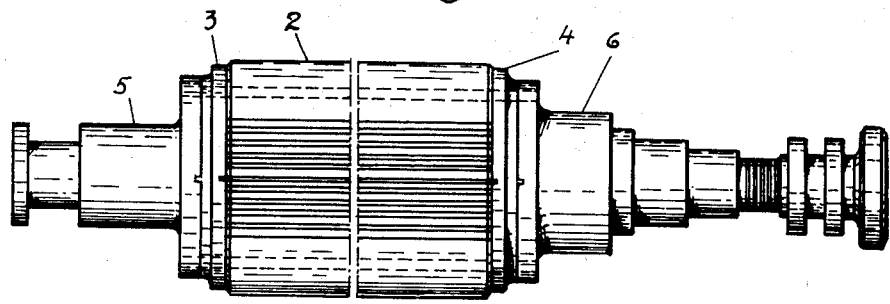

Dec. 26, 1933.    F. LJUNGSTRÖM    1,941,038
ELECTRIC MACHINE
Filed March 3, 1932    3 Sheets-Sheet 1

INVENTOR
Fredrik Ljungström.
BY
Cameron, Kerkam + Sutton
ATTORNEYS.

Dec. 26, 1933.   F. LJUNGSTRÖM   1,941,038
ELECTRIC MACHINE
Filed March 3, 1932   3 Sheets-Sheet 2

INVENTOR
Fredrik Ljungström.
BY
Cameron, Kerkam & Sutton.
ATTORNEYS

Dec. 26, 1933.     F. LJUNGSTRÖM     1,941,038

ELECTRIC MACHINE

Filed March 3, 1932     3 Sheets-Sheet 3

INVENTOR
Fredrik Ljungstrom.
BY
Cameron, Kerkam + Sutton.
ATTORNEYS

Patented Dec. 26, 1933

1,941,038

UNITED STATES PATENT OFFICE 1,941,038

ELECTRIC MACHINE

Fredrik Ljungström, Lidingo-Brevik, Sweden, assignor to Aktiebolaget Spontan, Stockholm, Sweden, a corporation of Sweden Application March 3, 1932, Serial No. 596,593, and in Sweden March 5, 1931

13 Claims. (Cl. 171—252)

The present invention relates to electric machines, and particularly to synchronous alternating current machines of the type operating at relatively high speed and employing a rotor which includes a rotating magnet having windings around the magnetic field. It is an object of this invention to improve the rotor construction in such machines.

In machines of the type characterized, particularly of relatively great output and high speed of rotation—as for instance machines of from 5,000 to 50,000 kw output rotating at 3,000 R. P. M., relatively high stresses due to centrifugal force tend to cause deformation of the rotor body and vary its radial dimensions. Furthermore, in large rotors considerable variations in dimensions occur due to temperature changes, the rotor expanding under high load due to increased heat generation, while at the same time the rotor is subject to irregular internal deformation due to variations of temperature occurring in the core and the pole shoes. The foregoing tends to vary not only the size of the rotor but also its regularity, dependent upon the load and the length of time during which the rotor is subjected to the varying heating effects and centrifugal stresses.

It has heretofore been proposed to secure the shaft trunnions to the magnet body proper by a circle of screw bolts and to employ concentric grooves and ribs on the trunnions and magnet body to center the one with respect to the other. These centering means, however, are also affected by the deformation of the rotor under the action of centrifugal force and the heating effects. It is also usual to arrange between the shaft trunnion and the magnet body a disc or other member of non-magnetic material to prevent magnetic leakage between the magnet poles of the rotor, and such a member is subject to deformation under centrifugal stress and the heating effects. When this intermediate member is made of metal its coefficient of heat expansion is much greater than that of the steel in the magnet body and the shaft trunnion, and its coefficient of elasticity is also greater, so that there is a tendency for the intermediate member to expand more than the magnet body and the shaft trunnion under the action of heat and centrifugal force. These deformations under centrifugal force and the heating effects tend to cause play between the surfaces provided for centering the parts and in time may result in a looseness or offcenter relationship that is productive of strong vibrations.

It is an object of the present invention to overcome the foregoing disadvantages and to maintain an exact centering between the different parts of the rotor by means that are unaffected by centrifugal force and variations in temperature. To this end, the different parts of the rotor, as the magnetic body, the non-magnetic intermediate members and the shaft trunnions, are maintained in proper relation to each other and the axis of rotation by mating grooves and projections, such as ribs, keys, or the like, said grooves and projections being preferably straight and lying in planes which intersect at or adjacent to the axis of rotation. In a bipolar rotor, for example, the grooves and projections preferably extend perpendicularly to each other, one set being arranged parallel to the windings and the other being symmetrically arranged transversely to the end surface of the poles. In multipolar rotors, as in a four pole rotor for example, the number of grooves and projections may be so selected that they are arranged symmetrically in the end surfaces of the poles while allowing radial expansion of the poles due to centrifugal force or heating effects.

The invention is capable of receiving a variety of mechanical expressions, some of which are shown in the accompanying drawings, but it is to be expressly understood that the drawings are for purposes of illustration only and are not to be construed as a definition of the limits of the invention.

In said drawings, wherein the same reference numerals indicate corresponding parts in the several figures:—

Figure 2:
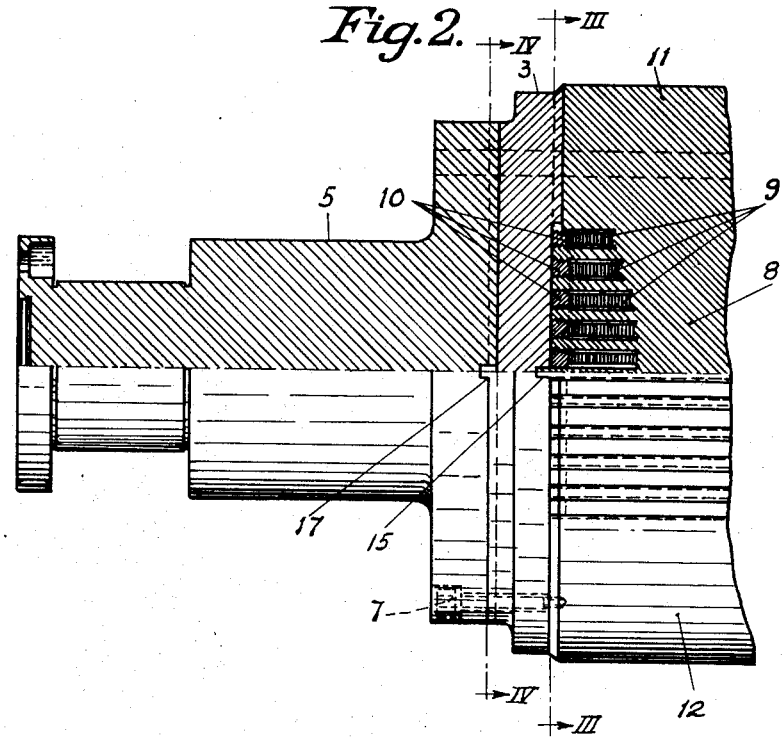
Figure 3:
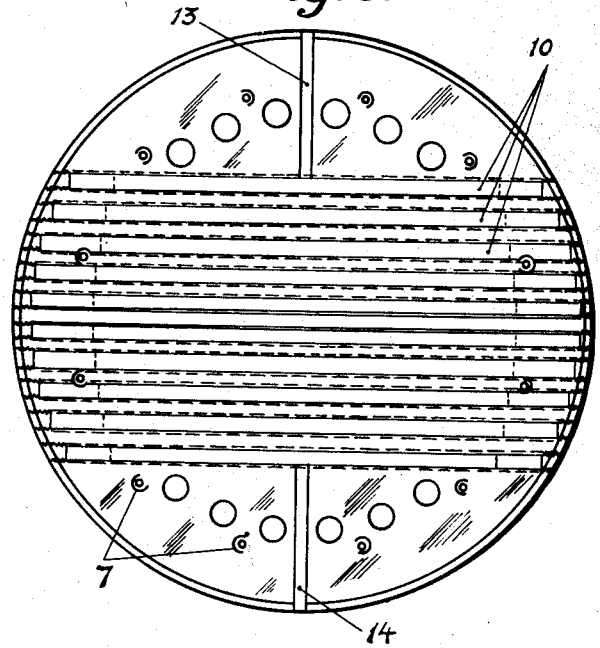
Figure 4:
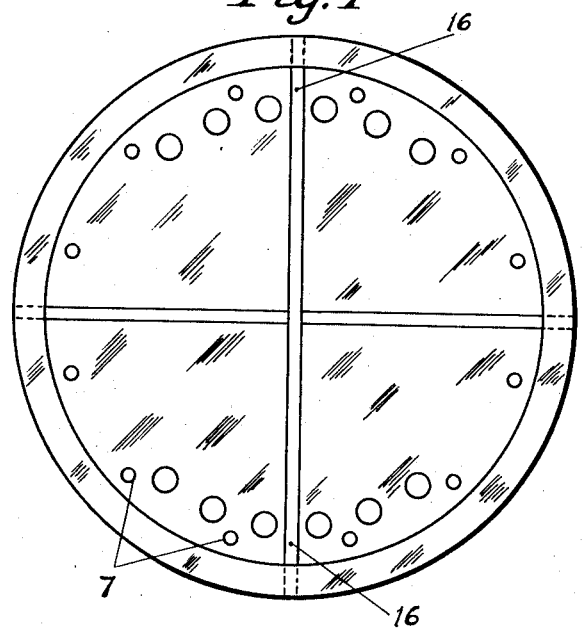
Figure 5:
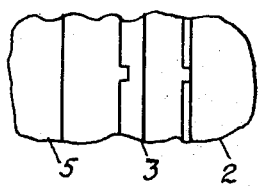

Figs. 1 to 5 inclusive show a bipolar rotor embodying the present invention, Fig. 1 being an elevation of the rotor, Fig. 2 being in part a section of an end portion of the rotor on a larger scale, Figs. 3 and 4 being end views of the magnet body and the intermediate member, and Fig. 5 being a fragmentary section illustrating the relative arrangement of the grooves and projections.

Figs. 6 to 11 are fragmentary views illustrating some of the various arrangements of grooves and projections that may be employed in conformity with the present invention.

The rotor shown in Figs. 1 to 5 inclusive is a bipolar turbo-rotor including a magnet body 2, two non-magnetic intermediate members in the form of plates 3 and 4, and shaft trunnions 5 and 6, said parts being secured in position by screw bolts 7. The rotor is shown as provided with so-called single-plane windings 9 of flat bar copper disposed in grooves extending around the magnet core 8 and maintained in position by keys 10. The two pole shoes 11 and 12 of the magnet core extend perpendicularly to the transverse winding grooves at the ends of the rotor, and therefore tend on rotation to expand at right angles to said grooves.

In conformity with the present invention the magnet body is provided with grooves 13 and 14 extending perpendicularly to the winding grooves and receiving corresponding projections, here shown as integral ribs, provided on each intermediate member 3. Thereby the rotor body and its pole shoes may assume different radial dimensions with respect to each intermediate member 3 by relative movement between the grooves and projections. The intermediate member 3 is also provided with a groove 15 extending parallel to the winding grooves, and therefore at right angles to grooves 13 and 14, and groove 15 receives a corresponding projection from the magnet core, thereby permitting relative radial movement and adjustment in this latter direction without interfering with exact centering. Similarly, each shaft trunnion 5 and the corresponding intermediate member 3 are provided with intersecting grooves and projections 16 and 17, which also permit relative radial movement and adjustment without interfering with exact centering. It will be observed that the foregoing arrangement is especially applicable to bipolar rotors, as in this case, with the diametric arrangement of the pole shoes 11 and 12 and their overhung relation to the pole core 8, said pole shoes may assume an oval shape in response to centrifugal force without interference from the interengaging ribs and projections 13 and 14.

Figure 6:
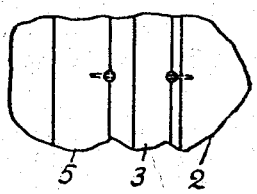
Figure 7:
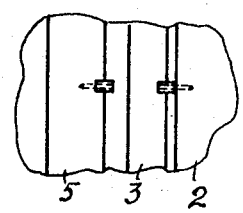
Figure 8:
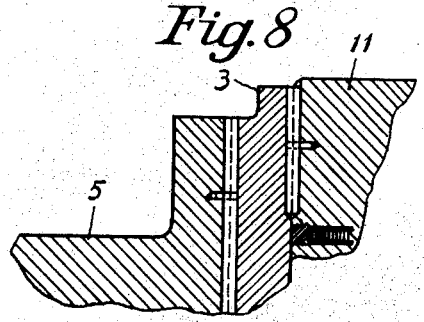
Figure 9:
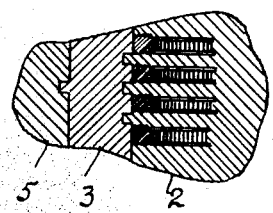
Figure 10:
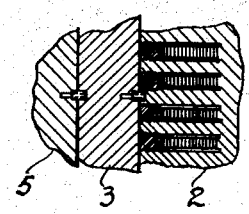
Figure 11:
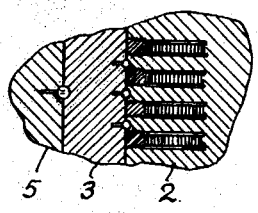

In each of Figs. 6 to 11 inclusive the magnet body is designated 2, the intermediate member 3 and the shaft trunnion 5, and these figures illustrate some of the various ways in which the invention may be embodied. Whereas the embodiment of Fig. 5 shows integral ribs, Figs. 6 and 7 illustrate the employment of round and flat keys respectively—Fig. 8 being a fractional sectional elevation illustrating the employment of keys. Figs. 9 and 11 illustrate the employment of a plurality of ribs or keys extending parallel to the winding grooves, and any suitable number of such projections can be employed, the figures indicating one between each pair of grooves.

As shown in these figures the projections may be formed upon either of the coacting members and extend into grooves formed in the other of said members. Where only one projection extends in each of the two right angular directions, their planes preferably intersect at or closely adjacent the axis of rotation. Where a plurality of parallel projections are used in one or both of the right angular directions, they are preferably arranged symmetrically and the planes of two right angularly disposed projections preferably intersect at or closely adjacent to the center of rotation.

It will therefore be perceived that by the present invention the members of the rotor are so centered with relation to each other that changes of radial dimension, by reason of either or both centrifugal force and the heating effects, are not productive of deformation of the centering means or the development of play and looseness between the parts because of repeated changes of radial dimension. While the invention has been described and illustrated with reference to certain embodiments thereof, it is to be expressly understood that they have been set forth only by way of illustration, as the construction and arrangement may be varied in numerous respects, as will now be apparent to those skilled in the art, without departing from the spirit of this invention. Reference is therefore to be had to the appended claims for a definition of said invention.

What I claim is:

1. In electric machines, particularly synchronously alternating current machines, of the type operating at relatively high speed and comprising a rotor which includes a rotating magnet and windings placed around the magnetic field, the combination of a rotor body, a trunnion, an intermediate member, and cooperating grooves and projections for centering said body and member while permitting relative radial movement therebetween, said cooperating grooves and projections lying in directions which intersect at or adjacent to the axis of rotation.

2. In electric machines, particularly synchronously alternating current machines, of the type operating at relatively high speed and comprising a rotor which includes a rotating magnet and windings placed around the magnetic field, the combination of a rotor body, a shaft trunnion, and cooperating grooves and projections for centering said body and trunnion while permitting relative radial movement therebetween, said cooperating grooves and projections lying in directions which intersect at or adjacent to the axis of rotation.

3. In electric machines, particularly synchronously alternating current machines, of the type operating at relatively high speed and comprising a rotor which includes a rotating magnet and windings placed around the magnetic field, the combination of a rotor body, a shaft trunnion, an intermediate member, and cooperating grooves and projections on said body and member and on said member and trunnion for centering the same while permitting relative radial movement therebetween, said cooperating grooves and projections lying in directions which intersect at or adjacent to the axis of rotation.

4. In electric machines, particularly synchronously alternating current machines, of the type operating at relatively high speed, the combination of a rotor body, an element cooperating therewith, and coacting grooves and projections on said body and element for centering the same relatively to each other while permitting relative radial movement, said coacting grooves and projections being straight and extending at right angles to each other.

5. In electric machines, particularly synchronously alternating current machines, of the type operating at relatively high speed, the combination of a rotor body, an element cooperating therewith, and coacting grooves and projections on said body and element for centering the same relatively to each other while permitting relative radial movement, said cooperating grooves and projections being symmetrically arranged and disposed in lines which intersect.

6. In electric machines, particularly synchronously alternating current machines, of the type operating at relatively high speed, the combination of a rotor body, an element cooperating therewith, and coacting grooves and projections on said body and element for centering the same relatively to each other while permitting relative radial movement, said coacting grooves and projections being straight and extending at right angles to each other and being disposed in lines which intersect at or adjacent to the axis of rotation of said rotor body.

7. In electric machines, particularly synchronously alternating current machines, of the type operating at relatively high speed, the combination of a rotor body, an element cooperating therewith, and coacting grooves and projections on said body and element for centering the same relatively to each other while permitting relative radial movement, said cooperating grooves and projections being symmetrically arranged and at least two of said coacting grooves and projections being disposed in lines which intersect at or adjacent to the axis of rotation of said rotor body.

8. In electric machines, particularly synchronously alternating current machines, of the type operating at relatively high speed, the combination of a rotor body, a shaft trunnion, an intermediate member, and coacting grooves and projections on said body, intermediate member and shaft trunnion for centering the same relatively to each other while permitting relative radial movement, said coacting grooves and projections extending at right angles to each other.

9. In electric machines, particularly synchronously alternating current machines, of the type operating at relatively high speed, the combination of a rotor body, a shaft trunnion, an intermediate member, and coacting grooves and projections on said body, intermediate member and shaft trunnion for centering the same relatively to each other while permitting relative radial movement, said cooperating grooves and projections being arranged in symmetrically arranged intersecting planes.

10. In electric machines, particularly synchronously alternating current machines, of the type operating at relatively high speed, the combination of a rotor body, a shaft trunnion, an intermediate member, and coacting grooves and projections on said body, intermediate member and shaft trunnion for centering the same relatively to each other while permitting relative radial movement, said coacting grooves and projections being straight and being disposed in lines which intersect at or adjacent to the axis of rotation of said rotor body.

11. In electric machines, particularly synchronously alternating current machines, of the type operating at relatively high speed, the combination of a rotor body, a shaft trunnion, an intermediate member, and coacting grooves and projections on said body, intermediate member and shaft trunnion for centering the same relatively to each other while permitting relative radial movement, said cooperating grooves and projections being symmetrically arranged and at least two of them being arranged in planes which intersect at or adjacent to the axis of rotation of said rotor body.

12. In electric machines, particularly synchronously alternating current machines, of the type operating at relatively high speed, the combination of a rotor body, an element cooperating therewith, and coacting grooves and projections on said body and element for centering the same relatively to each other while permitting relative radial movement, a plurality of said grooves and projections being parallel and disposed at an angle to another of said grooves and projections.

13. In electric machines, particularly synchronously alternating current machines, of the type operating at relatively high speed and comprising a rotor which includes a rotating magnet and windings placed around the magnetic field, the combination of a rotor body, an element cooperating therewith, and coacting grooves and projections on said body and element for centering the same relatively to each other while permitting relative radial movement, at least one of said coacting grooves and projections extending at right angles to said windings and another of said coacting grooves and projections extending parallel to said windings.

FREDRIK LJUNGSTRÖM.